(12) United States Patent
Davenport et al.

(10) Patent No.: US 7,404,204 B2
(45) Date of Patent: Jul. 22, 2008

(54) SYSTEM AND METHOD FOR AUTHENTICATION VIA A SINGLE SIGN-ON SERVER

(75) Inventors: Christopher J. Davenport, Houston, TX (US); Daniel C. Garza-Gonzalez, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 755 days.

(21) Appl. No.: 10/773,973

(22) Filed: Feb. 6, 2004

(65) Prior Publication Data

US 2005/0177730 A1    Aug. 11, 2005

(51) Int. Cl.
*H04L 9/32* (2006.01)
(52) U.S. Cl. .......................... 726/8; 713/155; 713/156; 713/170; 713/175; 707/201
(58) Field of Classification Search .................. 726/8; 713/170–171, 182, 155–156, 175; 709/229; 707/201
See application file for complete search history.

(56) References Cited

U.S. PATENT DOCUMENTS 6,240,512 B1 * 5/2001 Fang et al. .................. 713/150

| | | | |
|---|---|---|---|
| 7,174,383 B1 * | 2/2007 | Biswas et al. | 709/229 |
| 2003/0105981 A1 * | 6/2003 | Miller et al. | 713/202 |
| 2003/0226036 A1 * | 12/2003 | Bivens et al. | 713/201 |
| 2005/0039008 A1 * | 2/2005 | Bhatia et al. | 713/170 |

OTHER PUBLICATIONS

"Set Up Passport Authentication in ASP.NET (cont'd)," Passport Information Exchange; [Online] http://www.devx.com/security/Article/17483/0/page 2 (3 p.), unknown.
"Single Sign-on for Your Web Applications with Apache and Kerberos," OnLamp.com. Sep. 11, 2003; [Online] http://www.onlamp.com/pub/a/onlamp/2003/09/11/kerberos.html (4 p.).
"SecureLogin," Novell; [Online] http://www.novel.com/products/securelogin (1 p.), 2003.
"Novel SecureLogin: Novell Nsure Secure Identity Management," Novell Inc. [Online] http://www.novell.com/collateral/4621348/4621348.html (12 p.).

* cited by examiner

*Primary Examiner*—Thanhnga B Truong

(57) ABSTRACT

A system comprises a client workstation, a single sign-on ("SSO") server accessible to the client workstation, and a plurality of host servers accessible to the client workstation. Access by the client workstation to a first host server causes the client workstation to be automatically re-directed to the SSO server and the SSO server causes the client workstation to request sign-on credentials from a user if the user has not signed on to any of the host servers. The first host server, not the SSO server, authenticates the user.

19 Claims, 2 Drawing Sheets

SYSTEM AND METHOD FOR AUTHENTICATION VIA A SINGLE SIGN-ON SERVER

BACKGROUND

Many computer users are faced with having to "sign-on" to multiple computer services. Each such service may require the entry by the user of credentials such as a username and password so that the user can be authenticated to the service. As the number of services grows to which a user may desire access, the inconvenience of repeatedly entering the user's credentials also grows.

BRIEF SUMMARY

In accordance with at least some embodiments, a system comprises a client workstation, a single sign-on ("SSO") server accessible to the client workstation, and a plurality of host servers accessible to the client workstation. Access by the client workstation to a first host server causes the client workstation to be automatically re-directed to the SSO server and the SSO server causes the client workstation to request sign-on credentials from a user if the user has not signed on to any of the host servers. The first host server, not the SSO server, authenticates the user. Other embodiments comprise, among other features, related methods.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
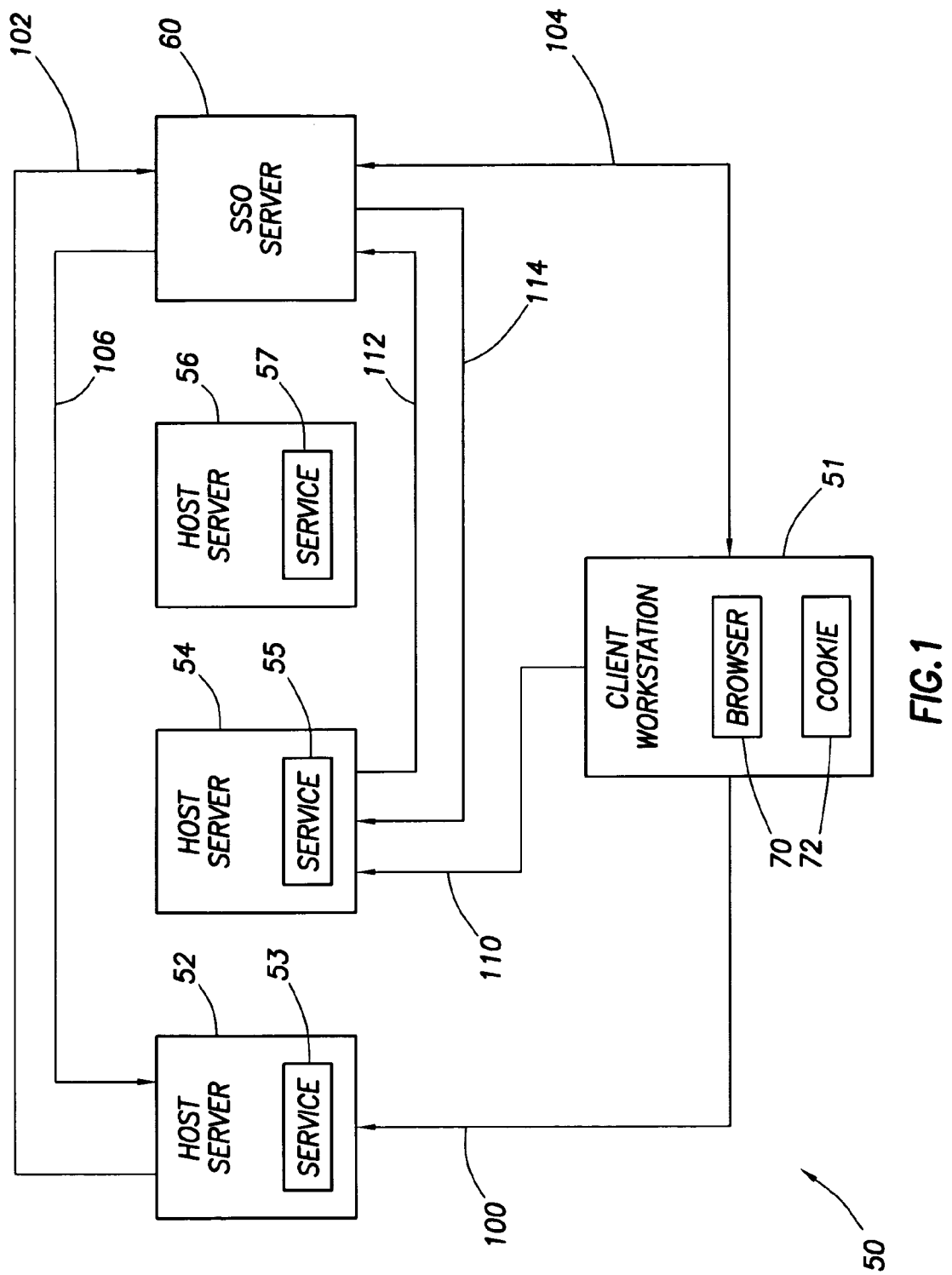
FIG. 1 shows a system by which a single sign on ("SSO") server enables a user of a client workstation to sign on only once to a plurality of host services.

Referring now to FIG. 1, a system 50 is shown in accordance with various embodiments of the invention. As shown, system 50 comprises a client workstation 51, a plurality of host servers 52, 54, and 56, and a single sign-on ("SSO") server 60. One or more services run on each of the host server 52, 54, and 56. For example, service 53 runs on server 52, service 55 runs on server 54 and service 57 runs on server 56. The functionality performed by the various services 53, 55, and 57 are application specific and thus subject to the needs of the various users. Any number (one or more) of host servers can be included in system 50 and any number (one or more) of services may run on each of the various servers. Although a single client workstation 51 is shown in FIG. 1, any number of client workstations may be included and have access to one or more of the various host servers and associated services.

Figure 2:
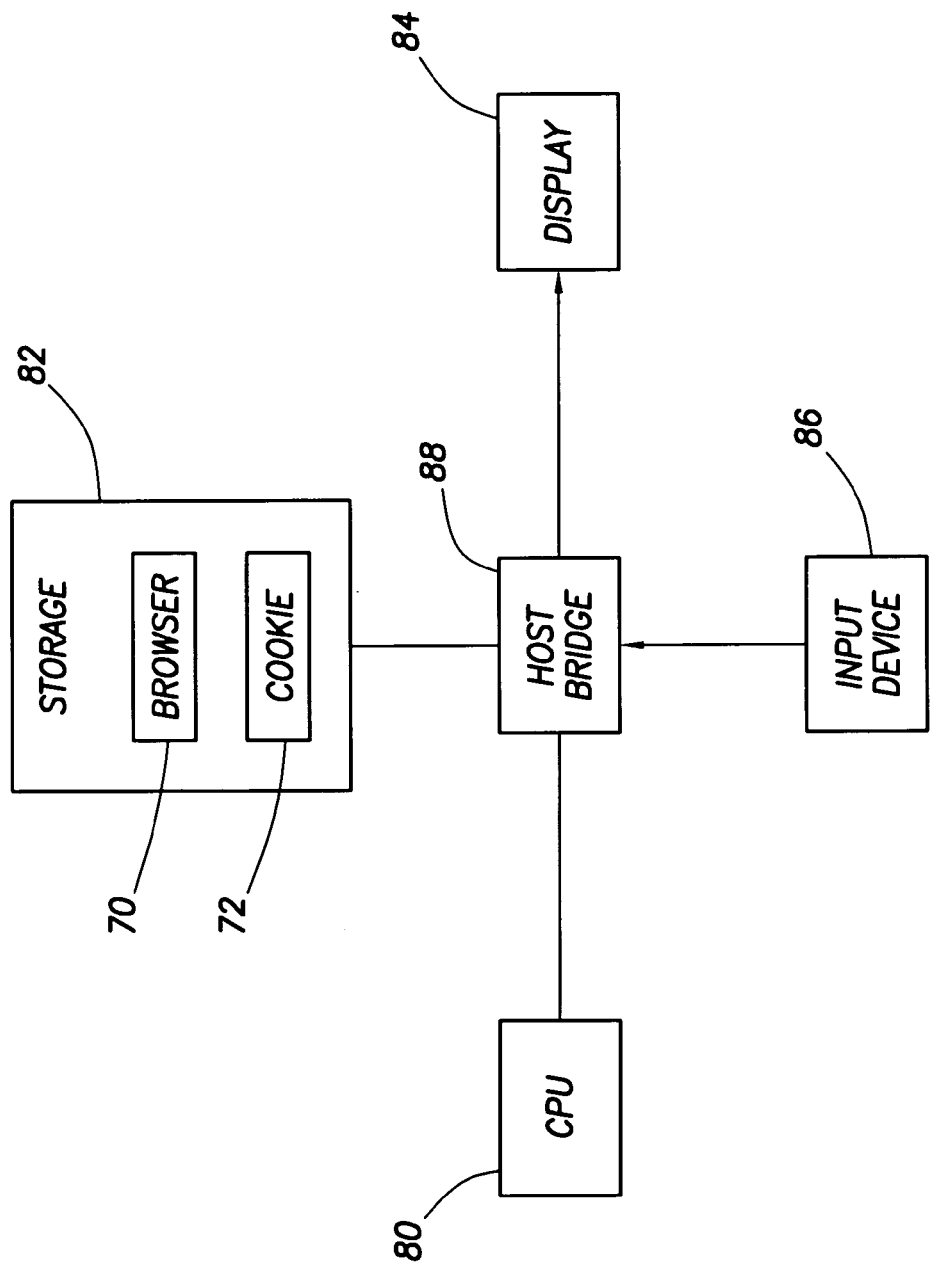
FIG. 2 shows an exemplary block diagram of a computer that may be representative of the client workstation or SSO server.

The client workstation 51, host servers 52, 54, and 56 and the SSO server 60 may be implemented as computers as shown in FIG. 2. Each such computer may comprise, as desired, a central processing unit ("CPU") 80, storage 82, a display 84, an input device 86, and a host bridge 88. Other components and configurations besides that shown in FIG. 2 are possible as well. Storage 82 may comprise volatile memory (e.g., random access memory) and/or non-volatile memory (e.g., hard disk drive, CD ROM). The display 84 may be representative of any suitable type of computer monitor. The input device 86 may comprise a keyboard, mouse, or both, or suitable types of input devices. In some embodiments, the SSO server 60 need not include a display and an input device. In various embodiments, the SSO server may be implemented as software (e.g., web pages, scripts) running on the client workstation 51 and not as a separate computer at all. Each of the host and SSO servers 52, 54, 56, and 60, as well as the client workstation 51, has an associated and unique uniform resource locator ("URL") and/or internet protocol ("IP") address, although other forms of server identification can be used.

In general, the CPU 80 executes software stored in storage 82. As shown in FIGS. 1 and 2, the client workstation 51 comprises a web browser 70 that is executed by the client workstation's CPU 80. As will be discussed below, a "cookie" may also be generated and stored on the client workstation 51. Thus, the browser 70 and cookie 72 are specific to the client workstation and need not be included in the host and SSO servers.

Referring to FIG. 2 and assuming the computer depicted therein represents the client workstation 51, via the client workstation, a user can access and use the services 53, 55, and 57 that run on the host servers 52, 54, and 56. One or more of the services may require authentication of the user before the user is permitted to use the service. In this context, authentication means verifying that the user is who the user claims to be. The authentication process may be implemented in accordance with a variety of techniques such as by the user entering a username and password. The information provided by the user in this regard is referred to as user "credentials." In accordance with at least some embodiments, all of the services 53, 55, and 57 use the same user credentials. In other embodiments, two or more services may use different user credentials (i.e., different usernames and/or passwords).

The SSO server 60 permits a user to sign-on to a service once, thereby avoiding having to sign-on to each service as the user desires to use each such service. In the example of FIG. 1, the user may, for example, sign-on to service 53 and subsequently access services 55 and 57 without having to re-enter the user's credentials. The following discussion describes the initial sign-on process in which the user is requested to enter his or her credentials and the subsequent sign-on process in which the user does not enter his or her credentials. The initial and subsequent sign-on processes as well as the use of the various services 53, 55, and 57 are performed, at least in part, by the user interacting with the display 84 and input device 86 of the client workstation 51.

The initial sign-on process is illustrated in FIG. 1 with regard to a user of the client workstation 51 attempting to sign-on to service 53 running on host server 52. In the following example, the user has not already signed-on to any of the services 53, 55, and 57. The arrows shown in FIG. 1 interconnecting the client workstation 51, host servers 52, 54 and SSO server 60 illustrate the process flow through the sign-on process. Via the browser 70, a user browses to, or otherwise accesses, service 53 (depicted by arrow 100). This process may entail, for example, the user selecting or entering a URL associated with server 52 and/or service 53, by entering an IP address associated with server 52 and/or service 53, or by entering other values to cause the browser to access the service 53.

Upon being accessed by the user's browser 70, the service 53 or host server 52 causes the user's browser to be re-directed or otherwise transferred to the SSO server 60 as depicted by arrow 102. In at least some embodiments, the services 53-57 are pre-programmed with the URL or IP address associated with the SSO server 60 to permit the re-direction to occur. As explained above, the SSO server 60 may be implemented as a separate computer and, as such, the re-direction causes the client workstation's browser 70 to access the SSO server computer. In the embodiments in which the SSO server 60 is not a separate computer, the re-direction may be implemented by causing the browser 70 to access and execute software (e.g., a web page or script) stored on the client workstation 51. The re-direction from the host server 52 to the SSO server 60 also may include providing the SSO server with the URL of the host server 52 as well as security information specific to the host server. The security information may include, for example, a public key associated with the host server that may be used by the SSO server to encrypt user credentials as explained below.

The SSO server 60 then permits the user to enter the user's credentials as depicted by arrow 104. Once the user enters the credentials, the SSO server 60 causes the client workstation to generate a data item such as a cookie 72 in which the credentials are stored. The cookie is stored on the client workstation 51. If desired, the credentials may be encrypted and stored in encrypted form in the cookie. If it is desired for the credentials to be encrypted, the credentials may be encrypted using a public key associated with the SSO server 60. The SSO server has the associated private key which the SSO server uses to subsequently decrypt the credentials. In some embodiments, the credentials may be encrypted using a symmetric key available only to the SSO server so that only the SSO server can decrypt the credentials. In other embodiments, the credentials are not encrypted when stored in the cookie. In still other embodiments, the credentials may be stored in the client workstation in a form other than a cookie. In yet other embodiments, credentials are stored elsewhere, such as in the SSO server, and a references is stored on the client workstation in the form of a cookie or otherwise.

The SSO server 60 also may cause, if desired, the user-entered credentials to be encrypted using the public key associated with the host server 52 that was provided to the SSO server as part of the security information in the original re-direction 102. Arrow 106 illustrates that browser 70 is then re-directed back to the host server's service 53 from which the sign-on process originated. This subsequent re-direction back to the host server 52 may use the URL of the host server that was included in the original re-direction (arrow 102) to the SSO server (the URL of host server 52 in this example). The re-direction back to the host server 52 may include providing the host server 52 with the user's credentials (in encrypted form if desired).

If the credentials are encrypted upon return to the host server, the host server 52 uses its own private key to decrypt the encrypted credentials. This instance of encryption is not the same as described earlier for storing the credentials in the client workstation 51. Once decrypted, the host server 52 may then authenticate the user in accordance with any suitable technique. For example, the user may have previously registered with the service 53 to initially generate the credentials. The host server 52 may authenticate the user by comparing the newly received credentials from the re-direction 106 to the credentials generated during the initial registration. Once successfully authenticated, the user may be granted access to the service 53. If the user is not successfully authenticated, the user is not granted access to the service 53. Moreover, the host server 52 authenticates the user, not the SSO server 60.

During or following this initial sign-on process, the cookie 72 is generated by and stored in the client workstation 51. The cookie, which contains the user's credentials, can then be used during subsequent attempts by a user to access other services 55 and 57 without the user having to re-enter the credentials. For example, the user may attempt to access service 55 (arrow 110) after having already signed-on to service 53. As before, the user's browser 70 is automatically re-directed to the SSO server 60 (arrow 112) this time including the URL associated with host server 54 and security information specific to host server 54. This security information may contain a public key associated with host server 54. The client workstation 51 and/or SSO server 60 determine whether a cookie that contains the user's credentials is already stored on the client workstation 51. In this example, because the cookie is in fact present, the previously generated and stored cookie is retrieved rather than forcing the user to re-enter the credentials. The SSO server 60 causes the credentials to be decrypted (if the credentials were stored in the cookie in encrypted form) and, if desired, causes the credentials to be encrypted using the public key associated with host server 54. The SSO server provides the user's encrypted credentials to the requesting host server in a re-direction of the browser 70 back to the host server 54 (arrow 114). The requesting host server 54 decrypts and authenticates the user's credentials as described above. In the disclosed embodiments, there is no direct communication between the various host servers 52, 54, and 56 and the SSO server for permitting a user to sign-on and/or access the various services.

In this manner, the user need enter his or her credentials only once when signing on to the first service the user attempts to access. If the credentials are stored in a cookie 72 in volatile memory (storage 82) in the client workstation, the cookie will be wiped out if the client workstation loses power (e.g., if the workstation is turned off) and the user will have to re-enter his or her credentials upon attempting to subsequently access one of the services 53, 55, and 57. If the cookie is stored in non-volatile memory in storage 82, the cookie, and thus the credentials, will be retained in the client workstation even if the workstation is turned off. In this latter embodiment, the user need not enter his or her credentials even following a power cycle of client workstation (assuming user previously signed-on to a service 53, 55, and 57). In the embodiments in which the SSO server 60 is implemented as a web page or script running on the client workstation 51, client credential information is maintained entirely within the client workstation's storage 82 and is not transmitted to a separate SSO server computer.

As stated above, the credentials used to authenticate a user of one service 53, 55, and 57 may be the same or different as the credentials used to authenticate a user to another of the services 53, 55, and 57. If all of the services use the same credentials, then signing-on to one service precludes having to sign-on and re-enter the credentials with respect to the other services. If, however, the services use different sets of credentials, then the user will be requested by the SSO server 60 to enter his or her credentials the first time the user accesses each of the services. Each different set of credentials can be stored within a common cookie or stored in separate cookies on the client workstation 51. Once signed-on to a service, the user need not re-enter the user credentials upon subsequent accesses to the same service.

Thus, the term "single sign-on" means either or both of the following:

Signing-on to one service and not having to enter credentials with respect to any other service; and Signing-on to a service once and not having to sign-on to the same service even following a power cycle of the client workstation.

The above discussion is meant to be illustrative of the principles and various embodiments of the present invention. Numerous variations and modifications will become. It is intended that the following claims be interpreted to embrace all such variations and modifications.

What is claimed is:

1. A system, comprising:
   a client workstation;
   a single sign-on ("SSO") server accessible to the client workstation;
   a plurality of host servers accessible to the client workstation, a unique public key being associated with each host server;
   wherein access by the client workstation to a first host server causes the client workstation to be automatically re-directed to the SSO server and the SSO server causes the client workstation to request sign-on credentials from a user if the user has not signed on to any of the host servers, and wherein the first host server, not the SSO server, authenticates the user; and
   wherein said sign-on credentials are used to authenticate the user upon accessing each host server, and wherein said siqn-on credentials are encrypted with the public key associated with the host server for which the sign-on credentials were most recently used to authenticate the user.

2. The system of claim 1 wherein, upon being re-directed to the SSO server, the first host server supplies the SSO server with security information that is used to encrypt sign-on credentials.

3. The system of claim 1 wherein the user's sign-on credentials are stored in the client workstation.

4. The system of claim 1 wherein the user's sign-on credentials are stored in the SSO server.

5. The system of claim 3 wherein, after the first host server authenticates the user, the client workstation accesses a second host server which causes the client workstation to be automatically re-directed to the SSO server, and wherein the SSO server causes the sign-on credentials to be retrieved and used by the second host server to authenticate the user without the user supplying additional sign-on credentials.

6. The system of claim 1 wherein the user's sign-on credentials are stored in a cookie in the client workstation.

7. The system of claim 1 wherein the user's sign-on credentials are stored in encrypted form in a cookie in the client workstation.

8. The system of claim 1 wherein, after requesting sign-on credentials from the user, the client workstation is automatically re-directed back to the first host server to authenticate the user.

9. A client workstation configured to access any one or more of a plurality of services, comprising:
   a CPU;
   an input device coupled to the CPU; and
   storage coupled to the CPU, said storage containing a browser that is executed by the CPU and that causes the workstation to:
      browse to a service that runs in a host server;
      automatically re-direct to a single sign-on ("SSO") server; and
      permit the host server to authenticate a user either by requiring the user to enter credentials via the input device if the user has not already signed-on to a service and providing the credentials to the host server or, without the user entering credentials, by providing credentials previously stored in the storage to the host server if the user has already signed-on to a service and providing the credentials to the host server;
      wherein said credentials are encrypted using a public key associated with the host server that the client workstation most recently accessed.

10. The client workstation of claim 9 wherein the CPU further causes the workstation to be re-directed back to the service to permit the host server to authenticate the user.

11. The client workstation of claim 9 wherein the credentials are stored in the storage.

12. A single sign-on ("SSO") server, comprising:
   a CPU;
   storage coupled to the CPU, said storage containing software that is executed by the CPU and that causes the SSO server to:
      cause user credentials to be entered by a user of a first computer if the user has not already signed-on to a service and to be encrypted using a first public key associated with a host computer, or to cause user credentials previously stored in the first computer to be retrieved, decrypted, and then encrypted using a second public key associated with a second computer, the first public key being different than the second public key; and
      cause the user credentials to be used by the second computer to authenticate the user.

13. A host computer on which a user accessible service is executed, comprising:
   a CPU; and
   software executable by said CPU;
   wherein the CPU causes a user's browser to be re-directed to a first computer to obtain user credentials and that causes a user's browser to be re-directed back to the host computer so that the host computer can authenticate the user using the credentials;
   wherein the CPU decrypts the credentials using a private key associated with the host computer.

14. A system, comprising:
   means for providing user identifying information from a user if the user has not already signed-on to a service;

means for retrieving user identifying information previously stored in a computer if the user has already signed-on to a service;

means for hosting a service and for authenticating the user using the user identifying information; and means for encrypting user credentials using a public key associated with a means for hosting, a different public key being associated with each of multirle means for hosting.

15. The system of claim 14 further comprising means for generating a cookie that contains the user identifying information and for storing the cookie in a user-controlled computer.

16. A method, comprising:

accessing a host server;

automatically re-directing from the host server to a sign-on server;

either retrieving previously stored user credentials if a user has already accessed a service or requesting the user to enter user credentials if the user has not already accessed a service;

re-directing back to the host server; and the host server authenticating the user using the user credentials; and encryping said user credentials with a pubhc key associated with the host server that the user most recently accessed, a different public key being associated with each of multiple host servers.

17. The method of claim 16 further comprising storing user-entered user credentials in a computer that is controllable by the user and that is not the sign-on server.

18. The method of claim 17 wherein storing the user credentials comprises storing the user credentials in a cookie that is stored in the computer.

19. The method of claim 16 further comprising, upon re-directing to the sign-on server, determining whether the user has already accessed a service.

* * * * *

UNITED STATES PATENT AND TRADEMARK OFFICE
CERTIFICATE OF CORRECTION

PATENT NO. : 7,404,204 B2 Page 1 of 1
APPLICATION NO. : 10/773973
DATED : July 22, 2008
INVENTOR(S) : Christopher J. Davenport et al.

It is certified that error appears in the above-identified patent and that said Letters Patent is hereby corrected as shown below:

In Column 5, line 49, in Claim 1, delete "siqn-on" and insert -- sign-on --, therefor.

In Column 7, line 8, in Claim 14, delete "multirle" and insert -- multiple --, therefor.

In Column 8, line 5, in Claim 16, delete "encryping" and insert -- encrypting --, therefor.

In Column 8, line 5, in Claim 16, delete "pubhc" and insert -- public --, therefor.

Signed and Sealed this

Twenty-fourth Day of March, 2009

JOHN DOLL
*Acting Director of the United States Patent and Trademark Office*